May 7, 1940.  R. M. MYERS  2,200,206
EDUCATIONAL DEVICE
Filed July 22, 1939  4 Sheets-Sheet 1
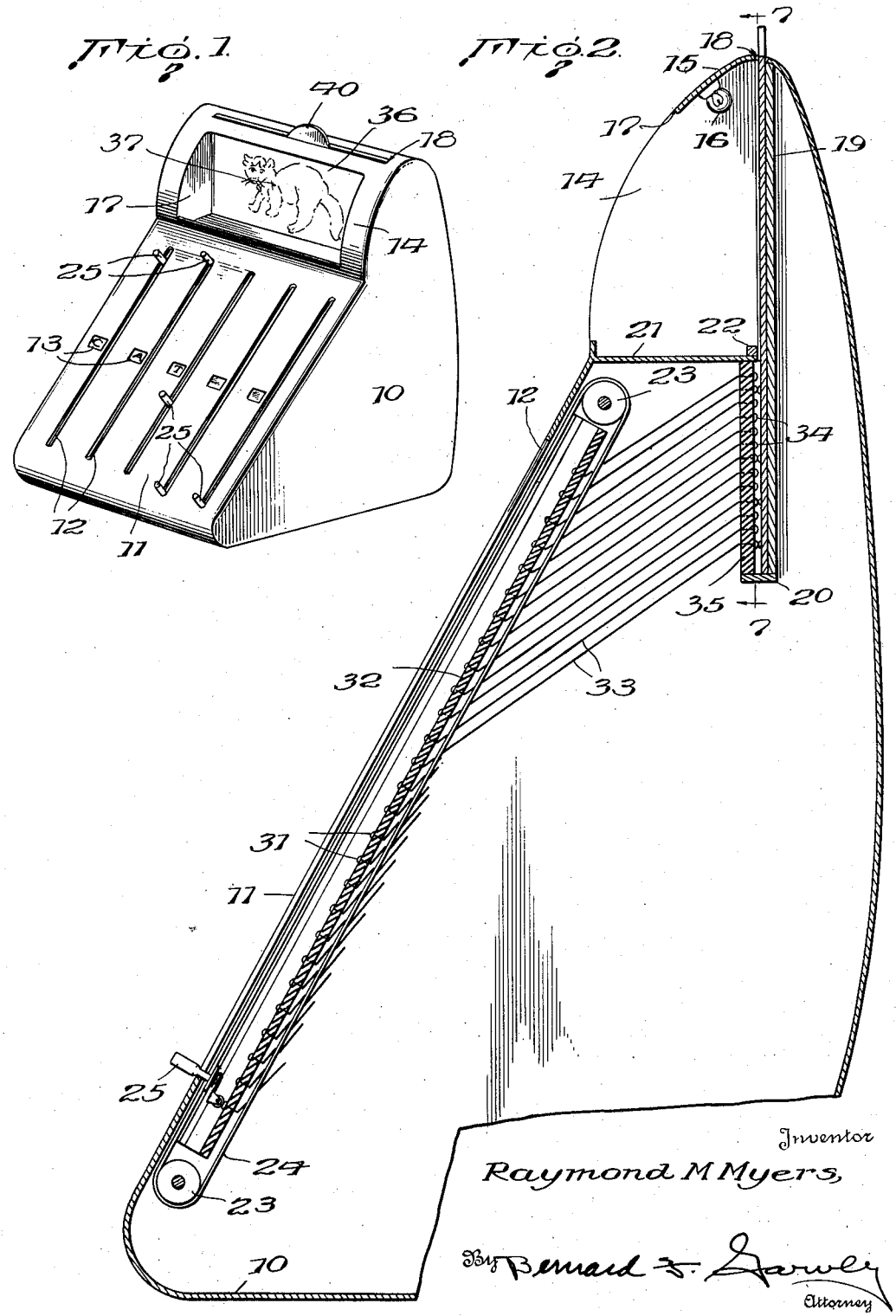
Inventor
Raymond M Myers,
By Bernard F. Gawley
Attorney May 7, 1940.　　　R. M. MYERS　　　2,200,206
EDUCATIONAL DEVICE
Filed July 22, 1939　　　4 Sheets-Sheet 2
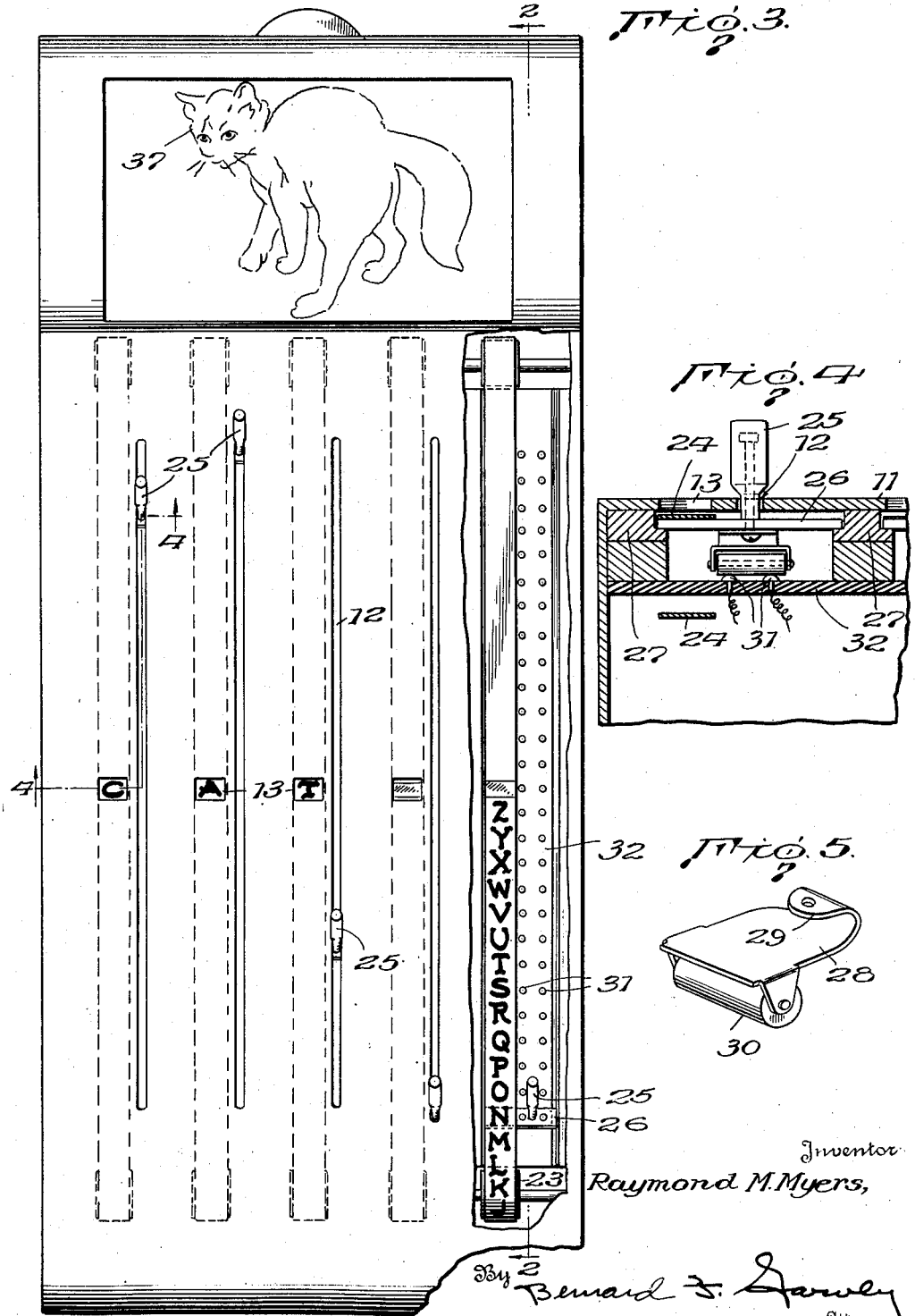

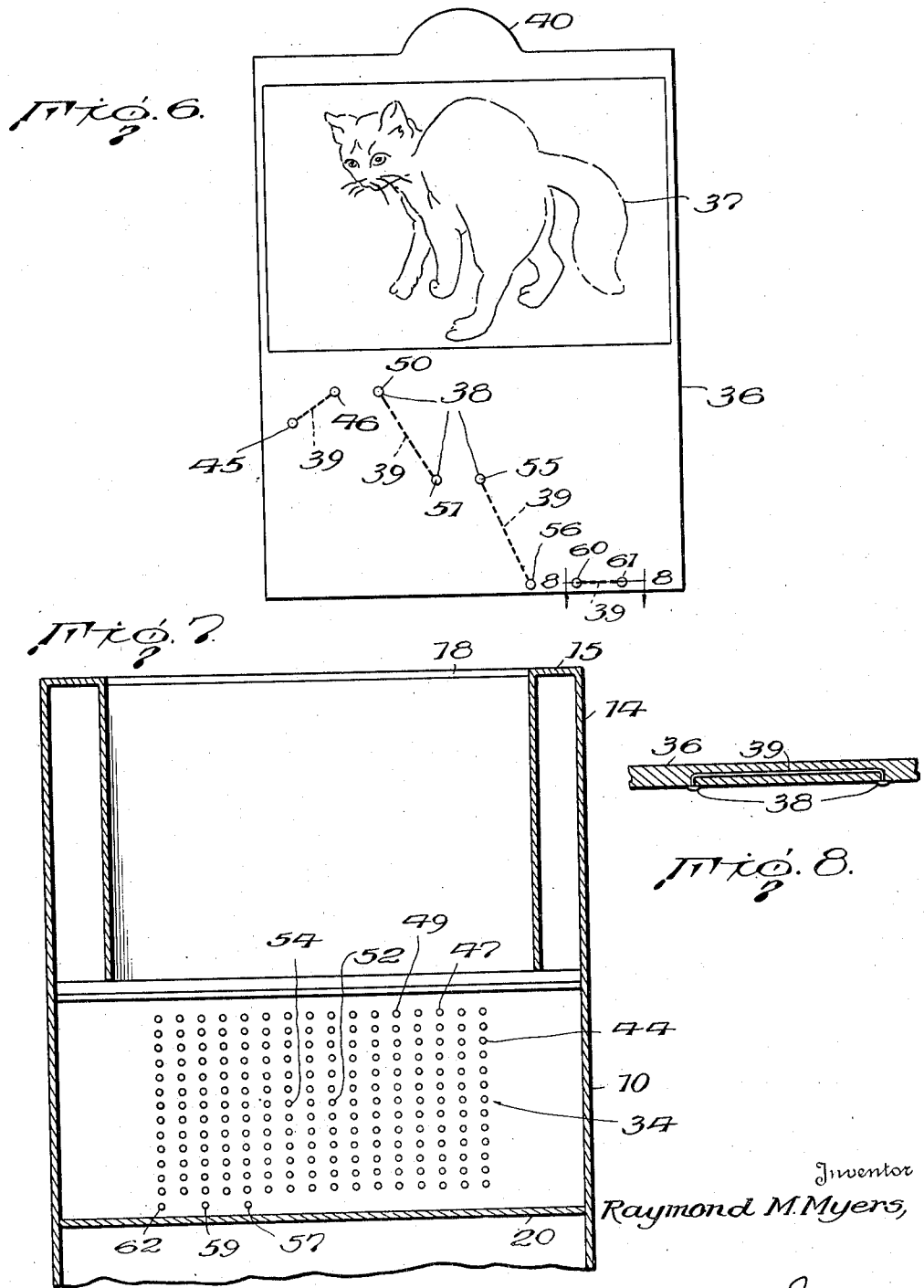

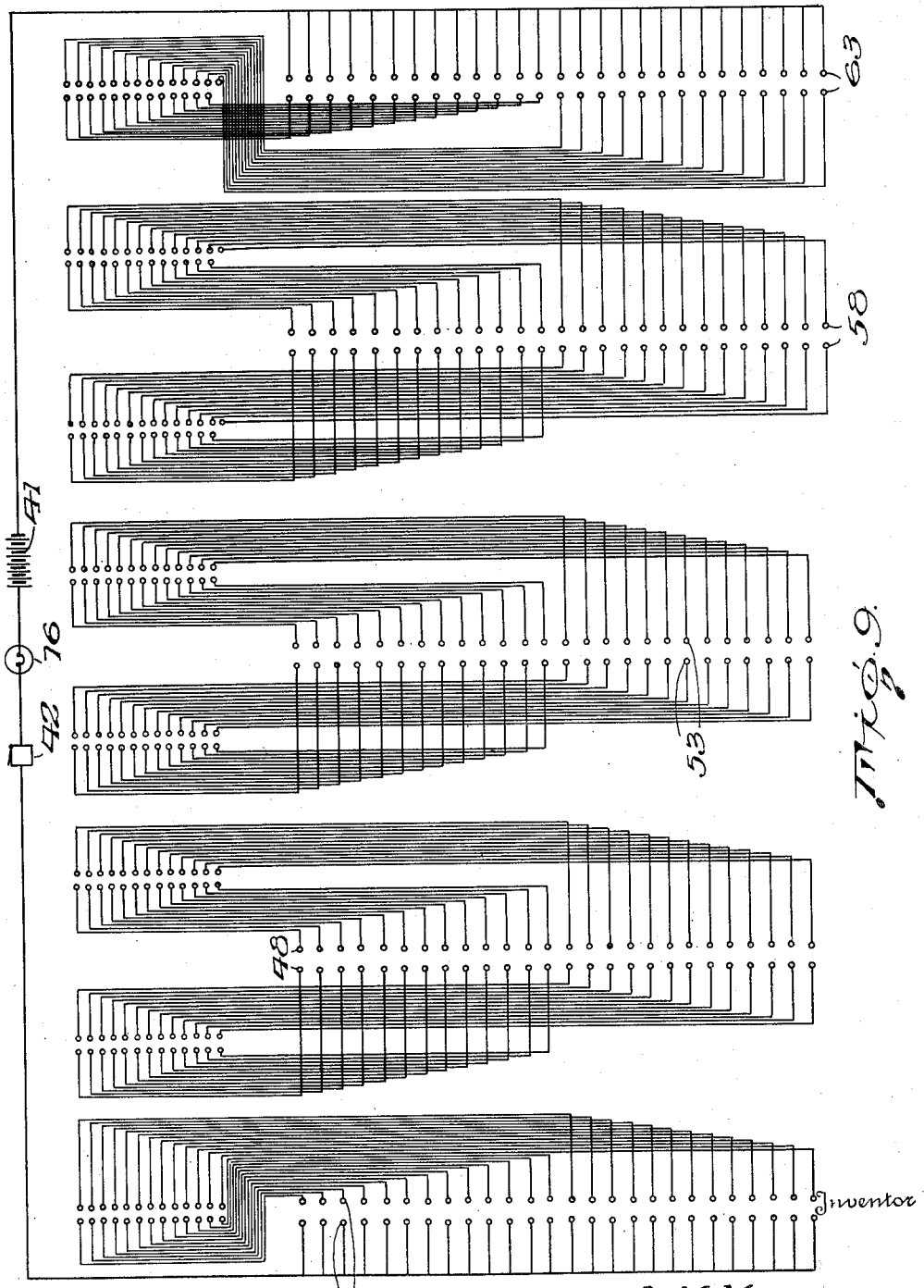

Patented May 7, 1940

2,200,206

UNITED STATES PATENT OFFICE 2,200,206

EDUCATIONAL DEVICE

Raymond M. Myers, Trenton, N. J.

Application July 22, 1939, Serial No. 286,028

5 Claims. (Cl. 35—9)

This invention consists of an educational device which is especially adapted for use in teaching spelling and to which I have applied the arbitrary name "Spellucator".

It is, of course, well known in this art to utilize apparatus of various miscellany as an aid to teaching various subjects, including spelling, and the present invention is designed as an improvement over the prior art devices. After much experiment, I have found that a practical compact electro-mechanical machine can be produced for the teaching of spelling by the association of objects with words, the machine being operable even by a child of tender age, without possibility of injury to the child or damage to the machine.

Another object of my invention is to provide a teaching apparatus of this character which is flexible to permit use of the same in spelling words or in arranging indicia in predetermined combinations for the purpose of displaying a characteristic of a depicted object in the apparatus, the depicted object being illustrated on removable cards or the like, each of the cards having contact combinations complementing contacts in the apparatus, all of the contacts being in electrical communication and including suitable signal means whereby either a visible or audible signal, or both, may be given when a predetermined combination of letters or other indicia has been assembled in proper sequence for the purpose of spelling or otherwise exhibiting a characteristic of the object depicted.

Other objects of the invention will be manifest from the following description of the present preferred form of the invention, taken in connection with the accompanying drawings, wherein Fig. 1 is a perspective view of an educational apparatus constructed in accordance with my invention, Fig. 2 is a fragmentary vertical sectional view of the same, Fig. 3 is a plan view of the apparatus, a portion thereof being broken away to disclose details of the mechanism within the apparatus casing, Fig. 4 is a detail fragmentary sectional view taken on the line 4—4 of Fig. 3, looking in the direction of the arrows, showing to advantage the manner of mounting one of the alphabetical belts in the casing and the means employed for operating the belt, Fig. 5 is a fragmentary perspective view showing one of the contact rollers and its frame, Fig. 6 is a plan view of one of the teaching cards employed in the present invention, Fig. 7 is a fragmentary vertical sectional view taken on the line 7—7 of Fig. 2, looking in the direction of the arrows, Fig. 8 is a detail fragmentary sectional view taken on the line 8—8 of Fig. 6, looking in the direction of the arrows, and Fig. 9 is a diagrammatical view of the electrical circuits employed in the present form of the invention.

This invention includes a casing or housing 10 having an inclined top 11, the latter being provided with a series of longitudinally extending slots 12 and a plurality of openings 13, each of the openings lying adjacent one of the slots 12 at a point approximately midway the terminals of the latter. The casing includes an exhibiting compartment 14, the top 15 of which is of arcuate conformation and equipped with suitable lighting means 16. The front of the compartment 14 is open, as indicated at 17, the apex of the compartment being provided with a transverse slot 18 for a purpose which will be hereinafter described. Directly in back of the opening 17, I have mounted a plate 19, the upper end of which engages the inner wall of the top of the compartment immediately in back of the slot 18, the lower end of the plate being supported by a casing carried bar 20. The floor 21 of the compartment 14 extends from the upper end of said top 11 rearwardly to a point just short of the front face of the plate 19 thereby providing a space between the rear margin of said floor and said plate 19 which space complements the slot 18, in the top of the compartment 14, for a purpose which will be also hereinafter described. If desired a combination bracing and guide rib 22 may be mounted on top of the floor 21 at the rear margin of the latter.

Beneath the casing top 11, and in proximity thereto, I provide pulleys 23, one pulley being positioned at approximately the terminal of each slot 12, as shown to advantage in Fig. 2. Each pair of pulleys carries an endless alphabetical belt 24. As the belts are trained around the pulleys 23, the letters of the alphabet, or other indicia employed, will appear beneath the openings 13 in the casing top 11.

For the purpose of moving the belts 24, I provide handles 25, the inner end of each of which is reduced and extends through one of the slots for engagement with a cross bar 26. One of the cross bars is fastened to each belt, the terminals of the bar riding in complemental grooves formed in casing carried guides 27.

Each of the bars 26 supports a roller bearing frame 28, one end 29 of the latter being reversely folded and detachably engaged with the inner end of one of the handles 25 through the bar 26. By reversely folding the part 29 of the frame, a contact roller 30, carried by each of the frames, is held in yieldable engagement with contacts 31, the latter being arranged in parallel rows on a contact board 32, as illustrated to advantage in Figs. 3 and 4.

The contacts 31 are wired, as indicated at 33, to corresponding contacts 34 carried by a panel 35. The panel 35 extends downwardly between the bottom wall of the floor 21 and the upper face of the bar 20, the contacts 34 lying parallel to the plate 19.

In Fig. 6, I have shown an object depicting card 36 which may be of oblong configuration, the upper portion thereof being devoted to the illustration of an object 37, while the lower part is provided with contacts, generally designated 38, these contacts being grouped in pairs and connected by wires 39, which may be embedded in the card 36. The upper margin of the card may be formed to provide a handle 40 to facilitate engagement of the card in and removal of the card from the slot 18 in the exhibiting compartment 14. When the lower end of the card 36 is deposited in the slot 18, it is permitted to gravitate downwardly against the front wall of the plate 19 until the contacts 38 impinge the contacts 34 of the panel 35.

The object depicting card 36 stands out in relief in the exhibiting compartment 14 directly back of the opening 17 in the front wall of said compartment. The handles 25 are manipulated until the proper combination of letters, which spell the name of the object 37, appear in the openings 13. At this time the contact rollers of each belt is bridging over a pair of the contacts 31 which are in circuit with certain of the contacts 34 and 38, through a source of energy 41. When the circuit is closed the lamp 16 in the exhibiting compartment is lighted thereby illuminating the object 37. At the same time a buzzer 42, also mounted in the electrical circuit, and shown in Fig. 9, will be operated. In this way a child spelling a word through the association of objects will be both visually and auricularly apprised of the correct spelling of the object depicted in the exhibiting compartment.

Of course, it is to be understood that almost any conceivable combination of letters may be employed for spelling various words regardless of the number of letters going to make up the same. The present apparatus which is shown only to illustrate the application of the invention, is adapted for use in spelling words of not less than three or more than five letters.

The specific operation of the invention for spelling the word "cat", a cat being the object depicted, is as follows. The handle in the first column on the left is operated until the letter "c" appears in terminal opening 13, in the extreme left side of the casing 10. This closes the circuit 43 carrying current to the parallel carrying contact 44 which contact engages the complemental card contact 45, the latter being connected to contact 46 through one of the concealed wire strands 39. Contact 46 impinges one of the group of contacts 34 which impinged contact, I have in Fig. 7, designated as 47. The contact 47 is connected with the second alphabetical series, designated 48. When the second letter o fthe word, namely, "a" is brought beneath the opening 13, the "a" circuit is closed carrying the current to another of the group 34 of contacts, this being indicated at 49, the latter impinging against card contact 50. Card contact 51 connected by another concealed contact wire 39 to the contact 50 impinges contact 52 of the panel group 34 of contacts and current is carried to the third alphabetical series, as indicated at 53. The circuit 53 is closed by placing the letter "t" beneath the third row of openings 13. In this way current is conducted to contact 54 which impinges card contact 55, the latter being connected to contact 56 by another of the concealed wires 39. The contact 56 engages contact 57 to carry current to the fourth alphabetical series at point 58 which is closed, by placing the blank space beneath the opening 13 in the fourth row. Electrical communication is then established to contact point 59 which impinges contact 60, the latter being connected to contact 61 by one of the concealed wires 39. Contact 61 engages contact 62 the latter being electrically connected to the fifth alphabetical series at point 63, which is closed by reason of a blank space appearing beneath the fifth and last of the openings 13. Consequently by closing the contact point at 63 the entire circuit is closed to effect the results already enumerated herein.

While I have herein shown and described a preferred form of my invention, it is nevertheless to be understood that various changes may be made therein within the scope of the claims hereto appended.

What is claimed is:

1. An educational device including a casing equipped with a plurality of indicia bearing movable belts, an object depicting member mounted in the casing, and signal means in electrical communication with said member and belts, said means operating when a predetermined combination of indicia, representative of a characteristic of the depicted object, appears in a predetermined position in the casing.

2. An educational device including a casing equipped with a plurality of indicia bearing movable belts, the casing having openings therein to singly display the belt indicia, an object depicting member mounted in the casing, means engaged with each belt for operating same to expose a predetermined combination of indicia in the casing openings, said combination of indicia being representative of a characteristic of the depicted object, signal means associated with said casing, and an electrical circuit including said belts, casing and member, the circuit being closed to operate the signal when the indicia appear in proper sequence in the casing openings.

3. An educational device including a casing equipped with indicia bearing movable belts, means for operating the belts to urge the indicia into a predetermined sequence, object depicting means engageable is said casing, a signal, said casing belt operating means, depicting means and signal being in electrical communication, the electrical circuit being closed when the indicia are in proper sequence to disclose a predetermined characteristic of the object depicted.

4. An educational device comprising a casing, object depicting cards singly mountable in the casing, indicia bearing supports movably mounted in the casing and susceptible of arrangement in a predetermined sequence to combinedly exhibit a characteristic of the object depicted, an electrical circuit including the casing, cards and indicia, electrical contacts on said casing, cards and indicia, and a signal in said circuit, the signal being operable upon engagement of the card contacts with certain of the casing contacts, through operation of the indicia, the contacts of the latter being in circuit with said casing contacts.

5. An educational device including a casing equipped with movable rows of indicia bearing supports, object depicting cards selectively mountable in the casing, means mounted in the casing and engaged with the rows of indicia to operate the latter for arranging the indicia in appropriate sequence to spell the name of the object depicted, and means operatively connected to the indicia and cards to give a signal upon the consummation of the appropriate sequence of the indicia.

RAYMOND M. MYERS.